No. 717,002. Patented Dec. 30, 1902.
W. C. HOOKER.
ANIMAL TRAP.
(Application filed May 26, 1902.)
(No Model.)
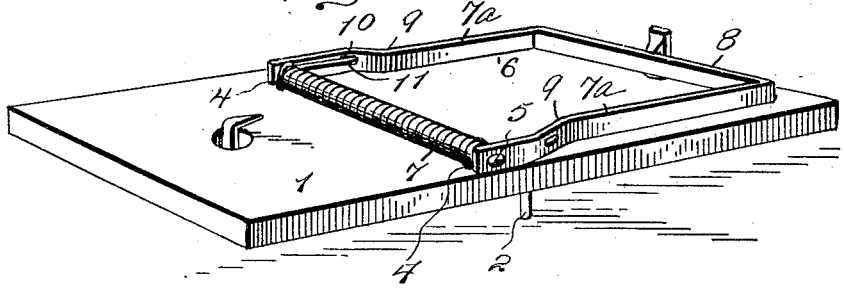
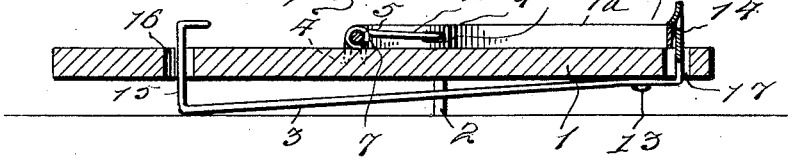
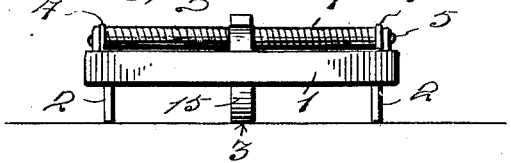
Witnesses
W. C. Hooker Inventor
by
Attorneys

UNITED STATES PATENT OFFICE.

WILLIAM C. HOOKER, OF ABINGDON, ILLINOIS.

ANIMAL-TRAP.

SPECIFICATION forming part of Letters Patent No. 717,002, dated December 30, 1902.

Application filed May 26, 1902. Serial No. 109,019. (No model.)

*To all whom it may concern:*

Be it known that I, WILLIAM C. HOOKER, a citizen of the United States, residing at Abingdon, in the county of Knox and State of Illinois, have invented a new and useful Animal-Trap, of which the following is a specification.

The invention relates to improvements in animal-traps.

The object of the present invention is to improve the construction of animal-traps and to provide a simple, inexpensive, and efficient one designed principally for catching mice, rats, and other small animals and provided with a trigger which will have a positive engagement with the spring-actuated jaw while setting the trap and which will be exceedingly sensitive when the trap is set.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention and shown set. Fig. 2 is a longitudinal sectional view of the same. Fig. 3 is an end elevation illustrating the arrangement of the trigger and the supporting pins or projections when the trap is set.

Like numerals of reference designate corresponding parts in all the figures of the drawings.

1 designates a base or platform, preferably constructed of wood and provided slightly in rear of the center with a pair of depending projections or pins 2, adapted to partially fulcrum the base or platform for a purpose hereinafter described and capable also of preventing the same from tilting laterally when the front portion of the base or platform is supported in an elevated position by the trigger 3. The platform or base is provided near its center and at opposite sides with bearings 4, consisting, preferably, of staples, and receiving a transverse pintle 5, which hinges a jaw 6 to the base or platform and which supports a coiled spring 7 for actuating the jaw. The jaw is approximately rectangular or U-shaped, being composed of sides 7ª and a transverse portion 8. The sides, which are perforated for the pivot or pintle 5, are inwardly bent at 9, and one of the sides is provided with an opening 10 to receive an arm 11 of the spring, the other arm 12 of the spring engaging the upper face of the base or platform. The pivot or pintle is provided at its ends with heads for retaining the sides of the jaw on its ends.

The trigger, which consists of a rod, is located beneath the base; but it can be arranged above the same, and it is fulcrumed between its ends by a pin 13, passing through an opening of the trigger and having a head. The ends of the trigger are bent upward to form a rear catch 14 and a front bait-holder 15, and the base or platform is provided with front and rear openings 16 and 17 for the bait-holder and the catch. The catch is provided at its front face with a beveled lug or projection formed by striking up a portion of the metal from the rear, and the terminal of the bait-holder is pointed and extended inward or rearward to enable a suitable bait to be readily placed on it. The spring-actuated jaw when swung rearward is adapted to engage the catch of the trigger automatically, and the shoulder of the catch is sufficiently pronounced to permit the trap to be readily set without liability of accidentally releasing the jaw, so that there will be no liability of pinching or otherwise injuring the fingers while setting the trap. When the trap is set, the front portion is supported by the trigger, which sustains a portion of the weight of the platform, thereby rendering the trap exceedingly sensitive, and the trap is fulcrumed on the pins or projections, which prevent the trigger from being subjected to too great a weight, thereby enabling the trap to be constructed sufficiently sensitive to cause it to be sprung by the slightest touch of an animal, whether such contact be accidental or whether the animal be enticed by the bait. The pressure of a mouse or other animal on the platform tilts the front portion downward and throws the catch rearward, thereby releasing the spring-actuated jaw.

It will be seen that the trap is exceedingly simple and inexpensive in construction, that it is positive and reliable in operation, and that the trigger, which supports the front portion of the trap when the latter is set, is relieved of a portion of the weight by the partial fulcruming of the trap on the pins or projections, and that the latter may be arranged at a point that will insure an exceedingly sensitive trap when the latter is set and at the same time enable the catch to firmly engage the jaw in setting the trap, so that the latter will not be accidentally sprung while setting it.

What I claim is—

1. A trap comprising a base or platform, a spring-actuated jaw, a trigger extending longitudinally of the platform and fulcrumed between its ends on the same and provided at its rear with an upwardly-extending catch arranged to engage the jaw, said trigger being provided at its front with an upright bait-holder extending through the platform and adapted when the trap is set to support the front portion of the same, and pins or projections depending from the platform or base at points between the ends thereof and forming a fulcrum and adapted to relieve the trigger of a portion of the weight of the trap and capable also of preventing the trap from tilting laterally, substantially as described.

2. A trap comprising a base or platform provided between its ends with depending supporting-pins, a spring-actuated jaw hinged to the platform, and a trigger extending longitudinally of the base or platform and arranged beneath the same and fulcrumed between its ends, said trigger having its ends bent upward and extended through the base or platform, the rear end being provided with a catch for engaging the jaw and the front end forming a bait-holder and supporting the front portion of the base or platform when the trap is set, substantially as and for the purpose described.

In testimony that I claim the foregoing as my own I have hereto affixed my signature in the presence of two witnesses.

WILLIAM C. HOOKER.

Witnesses:
W. A. DETRICK,
J. L. HOOKER.